(12) United States Patent
Pickelman, Jr. et al.

(10) Patent No.: US 8,474,416 B2
(45) Date of Patent: Jul. 2, 2013

(54) COOL LOGIC WITH AN INTEGRATED COOLER INTO THE CLUTCH/ENGINE BASE

(75) Inventors: Dale M. Pickelman, Jr., Marshall, MI (US); Theodore A. Malott, Jackson, MI (US); Christopher D. Reniger, Marshall, MI (US)

(73) Assignee: BorgWarner Inc., Auburn Hills, MI (US)

( * ) Notice: Subject to any disclaimer, the term of this patent is extended or adjusted under 35 U.S.C. 154(b) by 248 days.

(21) Appl. No.: 13/127,048

(22) PCT Filed: Oct. 28, 2009

(86) PCT No.: PCT/US2009/062274
§ 371 (c)(1),
(2), (4) Date: Apr. 30, 2011

(87) PCT Pub. No.: WO2010/056516
PCT Pub. Date: May 20, 2010

(65) Prior Publication Data
US 2011/0203539 A1    Aug. 25, 2011

Related U.S. Application Data

(60) Provisional application No. 61/197,781, filed on Oct. 30, 2008.

(51) Int. Cl.
*F01P 7/02* (2006.01)

(52) U.S. Cl.
USPC .................. 123/41.12; 192/82 T; 192/70.12; 192/85.61

(58) Field of Classification Search
USPC ............... 123/41.11, 41.12; 192/82 T, 58.64, 192/59, 85.61, 113.1, 113.21, 113.3, 113.31
See application file for complete search history.

(56) References Cited

U.S. PATENT DOCUMENTS

| | | | | |
|---|---|---|---|---|
| 3,804,219 | A * | 4/1974 | Cummings, III | 192/82 T |
| 4,425,879 | A * | 1/1984 | Shadday et al. | 123/41.12 |
| 7,047,911 | B2 * | 5/2006 | Robb et al. | 123/41.12 |
| 7,178,656 | B2 * | 2/2007 | Pickelman et al. | 192/103 F |
| 7,249,664 | B2 * | 7/2007 | Ignatovich et al. | 192/85.02 |
| 2006/0201771 | A1 * | 9/2006 | Ignatovich et al. | 192/85 AA |
| 2007/0215431 | A1 * | 9/2007 | Pickelman et al. | 192/86 |

* cited by examiner

*Primary Examiner* — Noah Kamen
*Assistant Examiner* — Hung Q Nguyen

(57) ABSTRACT

A hydraulically controlled fan drive system is provided including a housing containing a hydraulic fluid, a pulley connected to the housing a fan shaft rotatably mounted to the housing by a hydraulically actuated clutch, a piston mounted within a piston housing for actuating the clutch, a pitot tube for delivering pressurized hydraulic fluid from the housing to the piston housing, a valve for controlling the fluid pressure within the piston housing, a shaft rotationally supporting the housing having passages extending through the pulley, a base connected with the shaft connecting the shaft with a structure, the base having coolant inlet and outlet, and an oil cooler connected with the base on a side of said base generally axially opposite of the pulley.

9 Claims, 3 Drawing Sheets

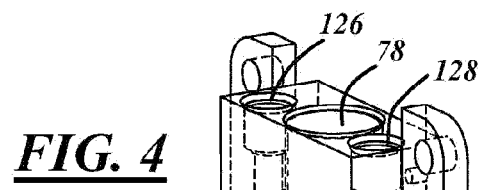
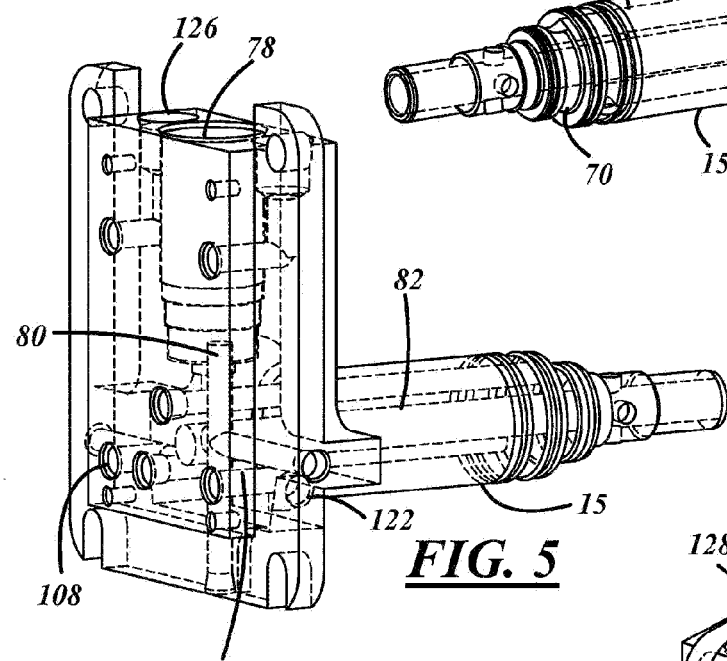
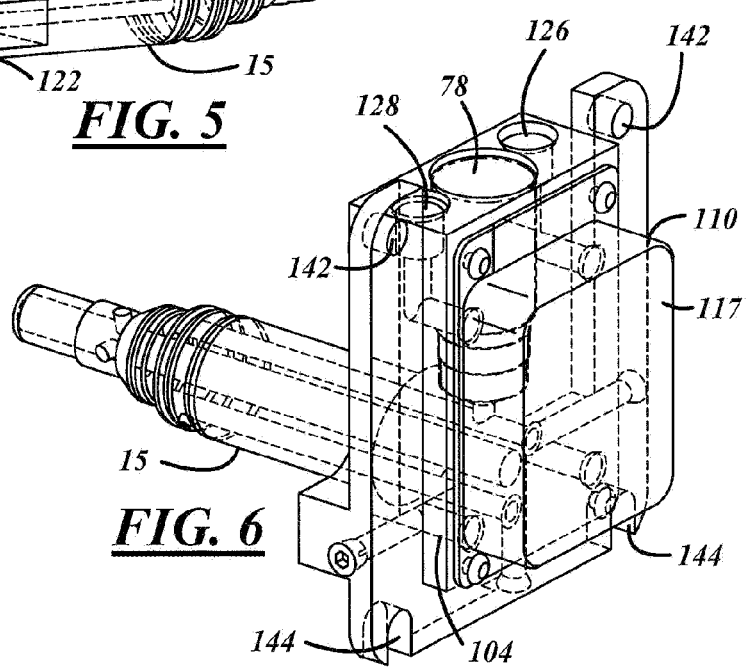

COOL LOGIC WITH AN INTEGRATED COOLER INTO THE CLUTCH/ENGINE BASE

CROSS-REFERENCE TO RELATED APPLICATIONS

This application is a PCT International Application of U.S. patent application No. 61/197,781 filed on 30 Oct. 2008. The disclosure(s) of the above application(s) is (are) incorporated herein by reference.

TECHNICAL FIELD

The invention relates generally to fan drive systems that are hydraulically controlled with integral cooling.

BACKGROUND OF THE INVENTION

Friction coupling devices and fluid coupling devices that drive radiator cooling fans for over the road trucks, such as class 8 trucks, are generally of two types, dry friction clutch assemblies and viscous drives, respectively.

Dry friction clutch assemblies tend to have two operating conditions "ON and OFF" referring to when a friction clutch is either fully engaged or fully disengaged. When a friction clutch assembly is providing cooling the clutch is fully engaged and not slipping. When the friction clutch assembly is not providing cooling the assembly is fully disengaged and slip speed is at a maximum between a clutch plate and an engagement surface.

The dry friction clutch assemblies generally have low thermal capacity, since they typically do not incorporate fluid flow cooling mechanisms. Thus, the clutch assemblies have minimal cooling capability and are unable to cycle repeat in short durations of time. Also, because of low thermal capacity, the clutch assemblies are also limited in torsional capacity, such that they are incapable of engaging at high engine revolutions per minute (rpm) or high engine speeds. The thermal energy that is generated during engagement at high engine rpm speeds can "burn up" or cause the clutch assembly to become inoperative.

Viscous drives, on the other hand, have become popular due to their ability to cycle repeat, engage at higher engine speeds, and have varying degrees of engagement. Viscous drives have an operating range of engagement and are generally less engaged at higher engine speeds and generally more engaged at lower engine speeds. Viscous drives are never fully engaged for internal viscous shear purposes.

Unfortunately, viscous drives are also thermally and torsionally limited. Viscous drives are always slipping to some degree causing them to be incapable of turning at fully engaged peak operating speeds or at higher speeds than originally designed. Since viscous drives are continuously slipping, they are continuously generating heat, unlike friction clutch assemblies. Viscous drives are further limited in that the more engine cooling needed the larger and more costly the viscous drive and cooling fan that is required. Thus, for increased engine cooling requirements viscous drives can become impractical in size and cost.

Due to increased engine cooling requirements, it is desirable that a fan drive system be capable of not only providing an increased amount of cooling over traditional fan drive systems but also that it have the associated advantages of a friction clutch assembly and of a viscous drive, as stated above, without the associated disadvantages. It is also desirable that the fan drive system be practical and reasonable in size and cost and to be approximately similar to and preferably not to exceed that of traditional fan drive systems.

To overcome the disadvantages of both of the aforementioned traditional fan drive systems, a new fan drive system has been developed which can be referred to as a solenoid actuated hydraulically controlled fan drive system. A housing assembly is provided which is typically in the neighborhood of 12-16 inches in diameter. To minimize parasitic losses, the housing is not completely filled with hydraulic fluid, but is typically filled with the hydraulic fluid such that there is only 1-2 inches of the hydraulic fluid spaced around a circumference (assuming that the housing is being spun). The fan drive system is engine driven via a belt or chain driven pulley. A stationary bracket rotatably mounts the pulley to the chassis of the vehicle. The pulley is fixable connected to the housing assembly. A clutch assembly within the housing assembly is selectively engaged to connect the rotative fan with the housing assembly. To actuate the clutch, there is a need to provide hydraulic pressure. To provide the hydraulic pressure, a pitot tube is utilized. The pitot tube is fixably connected to the bracket. The velocity of the fluid, which is rotating within the housing, is utilized to generate pressure by entering into an aperture of the stationary pitot tube. The pitot tube is also fluidly connected with a piston engaging circuit which through a clutch friction pack engages a fan hub which is rotatably mounted to the housing assembly. To control the amount of engagement of the fan hub with the housing assembly via the friction pack, a hydraulic control arrangement is provided. The hydraulic control arrangement controls the pressure within the pitot tube by selectively connecting the pitot tube with a reservoir sump. The reservoir sump occurs due to the void of fluid in the center of the housing assembly. A solenoid actuated relief valve is utilized to selectively cut off a fluid connection of the pitot tube with the low pressure sump formed within the radial center of the housing assembly. To ensure a full engagement of the rotating fan hub with the housing (fan locked in position), the pitot tube interior is blocked off from the sump thereby causing full pressure to be utilized to actuate the friction pack which torsionally connects the fan hub with the housing assembly. To allow the amount of torsional connection between the housing and fan hub to vary, an electrical controller system is utilized to selectively open and close the solenoid motor thereby controlling the amount of pressure which is exerted on the clutch the friction pack by the piston.

As mentioned previously, for partial fan operation, the clutch of the fan drive is continually slipping. This continual slippage generates a high amount of heat. In many situations, the amount of slippage heat generated is greater than that which can be transferred to the surrounding air by convection from fins located upon the fan drive housing. Accordingly, in many prior fan drive systems, operation has been limited to fully on or off state of operation. It is desirable to provide a fan drive system with a hydraulically actuated clutch which is more tolerant of partial clutch engagement.

SUMMARY OF THE INVENTION

A hydraulically controlled fan drive system is provided having a housing which is connected with a pulley. A fan shaft is rotatably mounted to the housing with a hydraulically actuated clutch. A piston is slidably mounted within a piston housing for actuating the clutch and a pressure tube is provided for delivering kinetically pressurized hydraulic fluid pressure within the housing assembly to the piston. A controllable valve is provided for controlling fluid pressure within the piston housing. A shaft rotatably supports the housing and the pulley and the shaft has passages extending through the pulley. A base is connected with the shaft for connecting the shaft to a vehicle structure. The base has a coolant inlet and outlet. An oil cooler is connected with the base on the side of the base generally axially opposite the pulley. The oil cooler has an oil inlet and an oil outlet fluidly connected with respective shaft passages. The oil cooler has a coolant inlet and a coolant outlet fluidly connected through the base with the base coolant inlet and outlet. The fan drive assembly of the present invention improves cooling characteristics which allows it to have optimal operation in periods of long term partial engagement of the fan shaft accordingly thereby allowing lower consumption of energy for cooling fan operation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a front perspective view of a shaft and integral base shown in FIGS. 1 and 2;

FIG. 5 is a rear perspective view of the shaft and base shown in FIG. 4;

FIG. 6 is still another side perspective view of the shaft and base shown in FIG. 5 with the oil cooler added on thereto.

DETAILED DESCRIPTION OF THE PREFERRED EMBODIMENTS

Figures 1, 3:
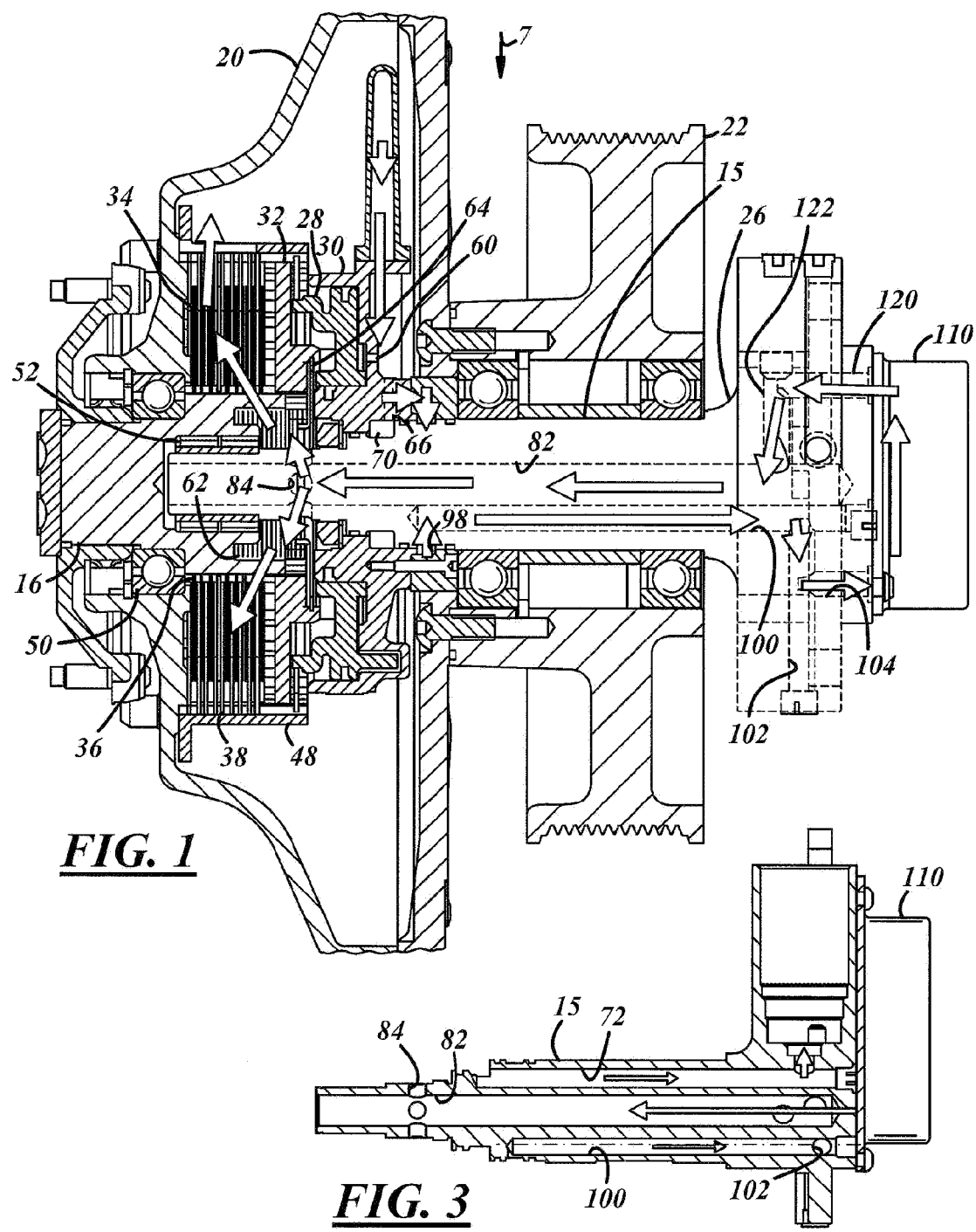
FIG. 1 is a top sectional view of a preferred embodied fan drive system according to the present invention.
FIG. 3 is a side sectional view of the shaft and base of the fan drive system shown in FIG. 1 with a cooler shown in a side elevational view.

The following description of the preferred embodiment(s) is merely exemplary in nature and is in no way intended to limit the invention, its application, or uses.

Referring now to FIGS. 1-7, a hydraulically controlled fan drive system 7 in accordance with an embodiment of the present invention is shown. The fan drive 7 uses rotational energy from a liquid cooled engine (not shown) at an increased ratio to turn a radiator cooling fan (not shown) to provide airflow through a radiator (not shown). The system 7 includes a housing assembly 20 fixed to a pulley 22, which is coupled to and rotates relative to a crankshaft (not shown) of the vehicle's engine, via a pair of belts (not shown), within an engine compartment (not shown). The present invention may be relatively operative in relation to various components via any number of belts or other coupling devices, such as a timing chain. The housing assembly 20 is mounted on the vehicle's engine via a shaft mounting bracket or shaft 15 integrally connected with a base 26. The housing assembly 20 hydraulically engages a fan shaft during desired cooling intervals to reduce temperature of the vehicle's engine or to perform other tasks further discussed below.

The fan drive 7 includes a piston 28 slidably mounted in a piston housing 30. The piston 28 when actuated by fluid pressure pushes on a pressure plate 32. Pressure plate 32 interacts with a friction pack 34. Friction pack 34 has a series of friction disks 36 spline connected along their interior diameter to the fan shaft 16 and friction disks 38 spline connected along their outer diameter to a cylindrical housing 48. The fan shaft 16 is connected by bearings 50 with the housing 20 along the housing inner diameter. The fan shaft 16 is connected by bearings 52 on a reduced diameter portion of the shaft 15.

A stationary pitot tube 54 is provided. The pilot tube 54 takes fluid kinetically pressurized within the housing 20 via an opening 56. The pressurized fluid entering opening 56 descends down the pitot tube 54 and is exposed to the pressure side of the piston 28 via an opening 60. Pressurizing the piston housing 30 on the side of the piston 28 exposed to the opening 60 causes the piston 28 to move leftwardly as shown in FIG. 1 to engage the friction pack 34 to torsionally connect the fan shaft 16 with the housing 20. A spring 62 along with a spring retainer 64 is provided to return the piston 28 to its retracted position upon a release of pressurized fluid which is exposed to the right side of the piston 28.

The pressure within pitot tube 54 moves radially inward through a passage 66. The passage 66 intersects with a radial groove 70 provided within the shaft 15. Groove 70 is intersecting with an axial line 72 provided in the shaft 15. Axial line 72 is intersected by a generally vertical line 74 (FIG. 4). Vertical line 74 extends into a solenoid valve chamber 76 wherein a solenoid actuated valve 78 (only shown schematically coterminous therewith) is positioned. Solenoid valve 78 can be controlled to selectively allow pressurized fluid in axial line 72 to be released through a pressure relief line 80 (FIG. 5). Pressure relief line 80 is intersecting with a central sump line 82 (FIG. 3). Sump line 82 is connecting with radial transverse lines 84 which deliver lubricated flow to the friction pack 34. The piston 28 will be fully engaged when it is desired to "lock" the fan shaft 16 with the housing 20 to provide for fan drive system operation at its fullest capacity. To achieve partial operation of the fan drive 7, the solenoid actuated valve 78 is opened to allow fluid from the pitot tube 54 to leak into the exhaust line 82 via the relief line 80. The action of the solenoid valve 78 may be a proportional type solenoid valve or can be a pulse width modulated solenoid valve. When partial operation of the fan drive 7 is desired, there will be slippage between friction disk 36 and friction disk 38. This slippage generates substantial amount of heat which is removed by the hydraulic fluid (typically transmission oil) and escapes into the housing 20. Typically, the housing has thin fins 87 along its outer surface to aid in removal of heat from the transmission fluid within the housing 20. However, the convection cooling of the housing fins 87 can be less than optimal.

Figure 2:
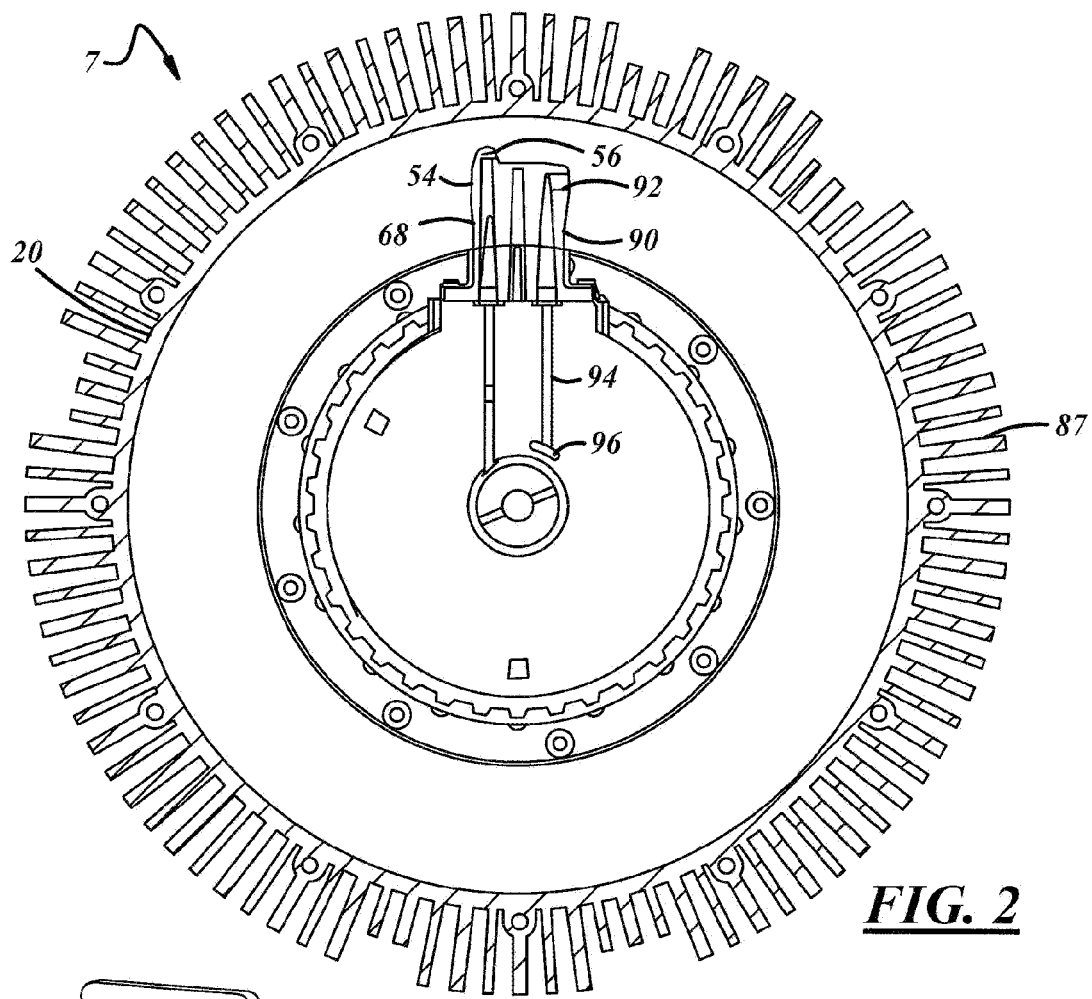
FIG. 2 is a cross sectional view of the fan drive system shown in FIG. 1.
Figure 7:
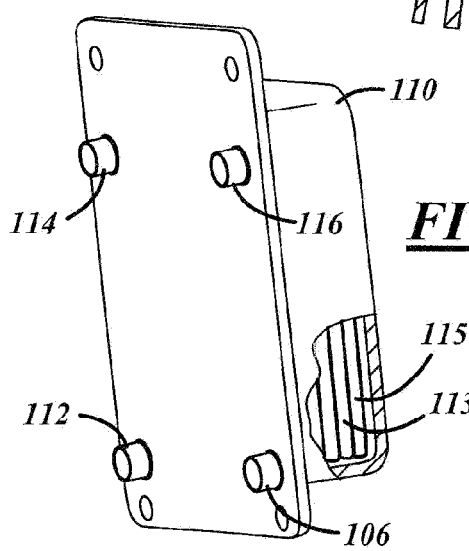
FIG. 7 is a perspective view of the oil cooler shown in FIGS. 1 and 6 with a partial portion sectioned.

The fan drive 7 also has a pitot tube 90 having an entrance 92. The pitot tube 90 is also provided by the common pitot tube housing 68. Pitot tube 90 fluidly communicates with a generally vertical passage 94 provided within the piston housing 30 wherein it intersects with a generally axial passage 96 (FIG. 2). Axial passage 96 intersects with a generally radial groove or passage 98 (FIG. 1). Passage 98 intersects an axial passage 100. The axial passage 100 is intersected by a shaft cross bore 102 which is in turn generally perpendicular intersected by a cooler intake passage 104. The cooler intake passage 104 intersects with a port 106. The port 106 is insertable within a hole 108 provided in the base 26. The cooler 110 is a multiple stage cooler providing several alternating passages 113, 115 of coolant and oil system flow for maximum heat exchange operation. In the embodiment shown, there is a slight clearance between the coolers face 117 and an internal combustion engine. In other embodiments, the cooler 110 can transfer heat to an internal combustion engine (not shown) by contact of its face 117 and outer housing therewith. The hydraulic fluid flows out of the cooler via a port 112. Ports 114 and 116 are provided for inlets and outlets respectively of the coolant for the cooler 110.

Pitot tube 90 delivers a source of pressurized fluid flow for the hydraulic fluid through the cooler 110. After leaving the cooler exhaust 112, the cooled hydraulic fluid enters intake line 120. A cross line 122 connects line 120 with line 82. Base coolant inlet 126 and outlet 128 are provided to bring coolant to and from the cooler 110.

The base 26 has a plate portion 140 which allows the structure to be connected with the vehicle engine (not shown) via openings 142 and 144.

The description of the invention is merely exemplary in nature and, thus, variations that do not depart from the gist of the invention are intended to be within the scope of the invention. Such variations are not to be regarded as a departure from the spirit and scope of the invention.

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims.

What is claimed is:

1. A hydraulically controlled fan drive system comprising:
a housing assembly containing a hydraulic fluid;
a pulley connected to said housing assembly for turning said housing assembly;
a fan shaft rotatably mounted to said housing by a hydraulically actuated clutch;
a piston slidably mounted with a piston housing for actuating said clutch;
a pressure tube for delivering kinetically pressurized hydraulic fluid pressure within said housing assembly to said piston housing;
a controllable valve for controlling the fluid pressure within said piston housing;
a shaft rotationally supporting said housing and said pulley, said shaft having passages extending through said pulley;
a base connected with said shaft for connecting said shaft with a structure, said base having coolant inlet and outlet; and
an oil cooler connected with said base on a side of said base generally axially opposite of said pulley having oil inlet and outlets fluidly connected with respective said shaft passages, and said oil cooler having coolant inlets and outlets fluidly connected through said base with said base coolant inlets and outlets.

2. A fan drive assembly as described in claim 1 wherein said base mounts said valve generally perpendicular with said shaft.

3. A fan drive assembly as described in claim 2 wherein said base has coolant inlets and outlets juxtaposed by said valve.

4. A fan drive system as described in claim 1 wherein said cooler is a multi-layer cooler.

5. A fan drive assembly as described claim 1 having at least two pitot tubes, one of said pitot tubes being connected with said valve and a second pitot tube being provided for providing flow to said cooler.

6. A fan drive system as described in claim 5 wherein said valve and said cooler are provided with a common exhaust line connected with one of said passages and said shaft.

7. A fan drive system as described in claim 1 wherein said base is integral with said shaft.

8. A fan drive system as described in claim 1 wherein said cooler has ports extending into said base.

9. A hydraulically controlled fan drive system comprising:
a housing assembly containing a hydraulic fluid;
a pulley connected to said housing assembly for turning said housing assembly;
a fan shaft rotatably mounted to said housing by a hydraulically actuated clutch;
a piston slidably mounted with a piston housing for actuating said clutch;
a first pitot tube for delivering kinetically pressurized hydraulic fluid within said housing assembly to said piston housing;
a controllable valve for controlling the fluid pressure within said piston housing;
a shaft rotationally supporting said housing and said pulley, said shaft having passages extending through said pulley;
a second pitot tube for delivering kinetically pressurized hydraulic fluid within said housing assembly through one of said shaft passages;
a base connected with said shaft for connecting said shaft with a structure, said base having coolant inlet and outlet; and
an oil cooler connected with said base on a side of said base generally axially opposite of said pulley having oil inlet and outlets fluidly connected with respective said shaft passages for cooling hydraulic fluid delivered by said second pitot tube, and said oil cooler having coolant inlets and outlets fluidly connected through said base with said base coolant inlets and outlets.

* * * * *